Oct. 22, 1935.  E. H. ANGEL  2,018,591
GARDENING IMPLEMENT
Filed Sept. 6, 1933
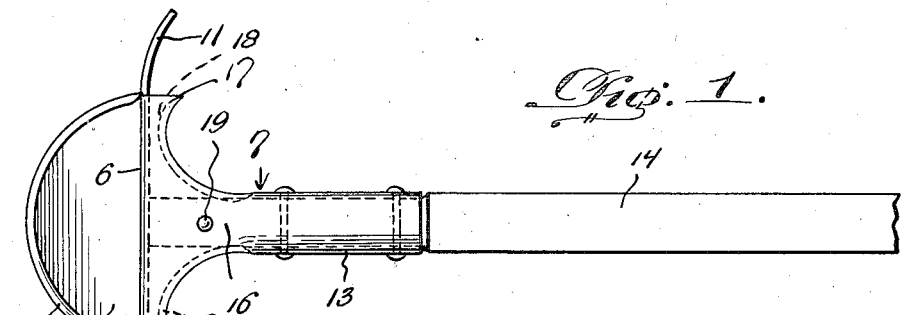
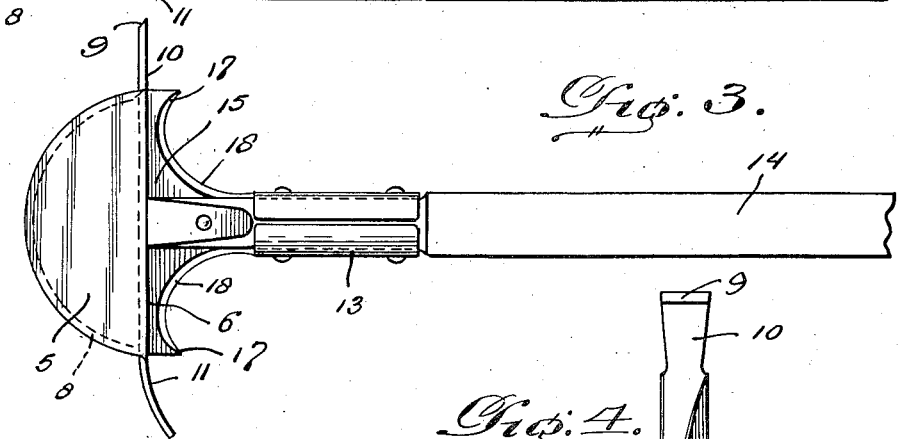
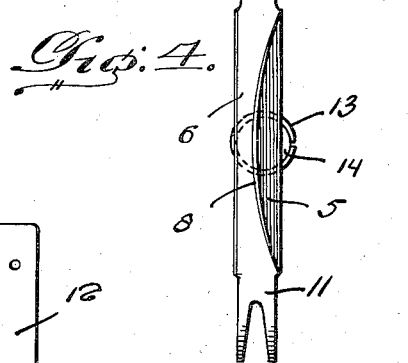
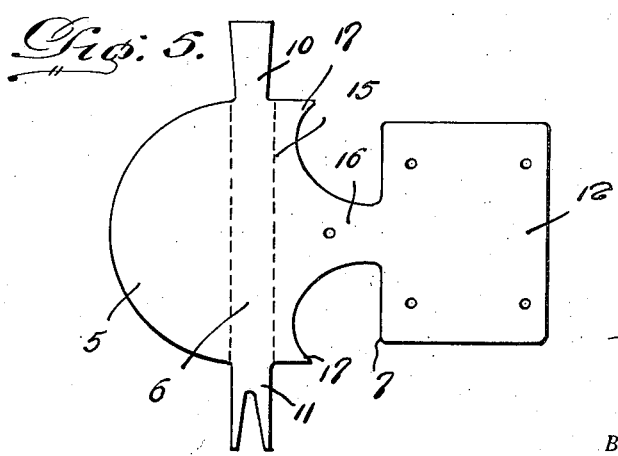
Elva H. Angel,
INVENTOR.
BY J. Stanley Burch
ATTORNEY.

Patented Oct. 22, 1935

2,018,591

UNITED STATES PATENT OFFICE 2,018,591

GARDENING IMPLEMENT

Elva H. Angel, Los Angeles, Calif.

Application September 6, 1933, Serial No. 688,379

4 Claims. (Cl. 97—66)

This invention relates to certain new and useful improvements in gardening implements, and the primary object of the invention is to provide a durable and comparatively simple and inexpensive tool by means of which several different gardening operations may be performed in an easy and effective manner.

More particularly, the present invention has reference to an improved form of head for gardening implements or tools of the above character, the head being of one-piece stamped metal construction to provide for ready and economical manufacture, and being of such form as to afford extreme durability and lightness of weight, as well as to facilitate ease and efficiency of operation.

The invention consists in the novel form of implement head hereinafter more fully described, shown in the accompanying drawing, and claimed.

In the drawing:

Figure 1 is a top plan view of a gardening implement constructed in accordance with the present invention.

Figure 2 is an edge elevational view thereof.

Figure 3 is a bottom plan view of the same.

Figure 4 is an end elevation looking toward the right of Figure 3; and

Figure 5 is a plan view of the blank from which the implement head is formed.

Referring more in detail to the drawing, the implement embodying the present invention includes a head of one-piece stamped metal construction and formed from a sheet metal blank of the outline illustrated in Figure 5 which consists of integral forward, intermediate and rear portions 5, 6 and 7, respectively. The intermediate portion 6 is of narrow form and has the forward portion portion 5 extended from the lower longitudinal edge thereof at an obtuse angle as shown in Figure 2, while the rear portion 7 extends in an opposite direction from the other longitudinal edge of the intermediate portion 6 at right angles to the latter. The forward portion 5 is of segmental shape and has the curved forward edge thereof sharpened as at 8 to constitute a hoe blade and a lawn edge trimmer. The ends of the intermediate portion 6 project beyond the sides of the forward portion 5, and one projecting end thereof is provided with an outer sharpened edge 9 and provides a narrow hoe blade 10 particularly useful for cultivating in between plants. The other projecting end of the intermediate portion 6 is bifurcated to provide a narrow weeder blade 11 especially serviceable for weeding in between plants.

The rear portion 7 has a rear part 12 bent to form a tubular socket 13 in which is secured an end of a suitable handle 14. The rear portion 7 further includes a forward part 15 of a width substantially equal to the major width of the forward portion or blade 5, and a narrow intermediate part 16 connecting the forward part 15 intermediate the sides of the latter with the socket 13 and constituting a shank for that purpose. The forward part 15 is thus provided with rear edges at opposite sides of the shank or intermediate part 16, which edges are laterally and rearwardly curved and merge with the side edges of the intermediate or shank part 16 to provide rearwardly facing brush or pruning hooks 17, the rear edges of forward part 15 and the side edges of intermediate part or shank 16 being sharpened as at 18 to render such hooks 17 efficient for pruning and brush removing operation. It will be noted that the projecting end of part 6 forming the weeder blade 11 is curved rearwardly to more efficiently facilitate weeding operations, while the narrow hoe blade 10 is preferably left straight or co-extensive with the body of intermediate portion 6. Also, the handle 16 is preferably extended forwardly through the socket 13 so as to abut the rear side of intermediate portion 6, and the forward end of handle 14 between portion 6 and socket 13 is preferably secured to the shank or intermediate part 16 by riveting or the like as at 19. This assists in permanent attachment of the handle and at the same time utilizes the latter to reinforce the shank 16 against bending and the part 6 against rearward bending relative to the rear portion 7, and particularly relative to the forward part 15 of the latter.

From the foregoing description, it is believed that the construction, operation and advantages of the present invention will be readily understood and appreciated by those skilled in the art. It is noted, however, that the blade 5 is used in hoeing operations by placing the same in a nearly horizontal position, at which time a forward movement is given to the tool, instead of a rearward pulling movement as is common in the use of ordinary hoes. Also, in using the blade 5 for lawn edge trimming, said blade is positioned upright and the tool is rocked on its forward curved edge 8. It will be readily seen that the tool head is extremely durable and light in weight, and may be readily and economically manufactured. At the same time, the several parts of the tool may be readily presented in the proper manner to perform the desired operation.

What I claim as new is:

1. In a gardening implement of the character described, a head stamped from a single piece of sheet metal and including a narrow transverse intermediate portion, a segment-shaped forward portion, and a rear portion, said forward portion extending forwardly at an obtuse angle from one longitudinal edge of the intermediate portion and having a curved cutting edge to provide a hoe blade and lawn edge trimmer, said rear portion extending rearwardly from the other longitudinal edge of the intermediate portion at right angles to the latter and composed of forward and rear parts centrally connected by a narrow shank, said rear part being bent to form a handle socket co-extensive with said shank, and a handle secured in said socket and extending forwardly through the latter beneath said shank and abutting said intermediate portion of the head.

2. In a gardening implement of the character described, a head stamped from a single piece of sheet metal and including a narrow transverse portion provided with a blade and a rear portion, said rear portion extending rearwardly from one longitudinal edge of the transverse portion at right angles to the latter and composed of forward and rear parts centrally connected by a narrow shank, and said rear part being bent to form a handle socket co-extensive with said shank, and a handle secured in said socket and extending forwardly through the latter beneath said shank and abutting said transverse portion.

3. In a gardening implement of the character described, a head stamped from a single piece of sheet metal and including a narrow transverse intermediate portion, a segment-shaped forward portion, and a rear portion, said forward portion extending forwardly at an obtuse angle from one longitudinal edge of the intermediate portion and having a curved cutting edge to provide a hoe blade and lawn edge trimmer, said rear portion extending rearwardly from the other longitudinal edge of the intermediate portion at right angles to the latter and composed of forward and rear parts centrally connected by a narrow shank, said rear part being bent to form a handle socket co-extensive with said shank, and a handle having an end portion fitted and secured within the socket and projecting forwardly against the under side of the shank with its forward end abutting the rear side of said intermediate portion to reinforce the latter and the shank against bending.

4. In a gardening implement of the character described, a head stamped from a single piece of sheet metal and including a narrow transverse intermediate portion, a segment-shaped forward portion, and a rear portion, said forward portion extending forwardly at an obtuse angle from one longitudinal edge of the intermediate portion and having a curved cutting edge to provide a hoe blade and lawn edge trimmer, said rear portion extending rearwardly from the other longitudinal edge of the intermediate portion at right angles to the latter and composed of forward and rear parts centrally connected by a narrow shank, said rear part being bent to form a handle socket co-extensive with said shank, said narrow intermediate portion having its ends projecting beyond opposite sides of the forward portion and the forward part of the rear portion to provide narrow hoe and weeder blades respectively having a sharpened outer edge and formed to provide rearwardly curved bifurcations.

ELVA H. ANGEL.